UNITED STATES PATENT OFFICE.

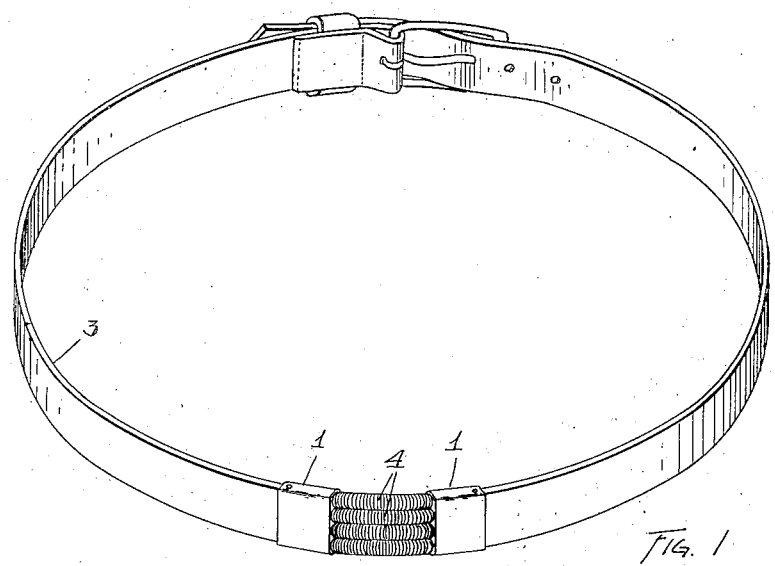
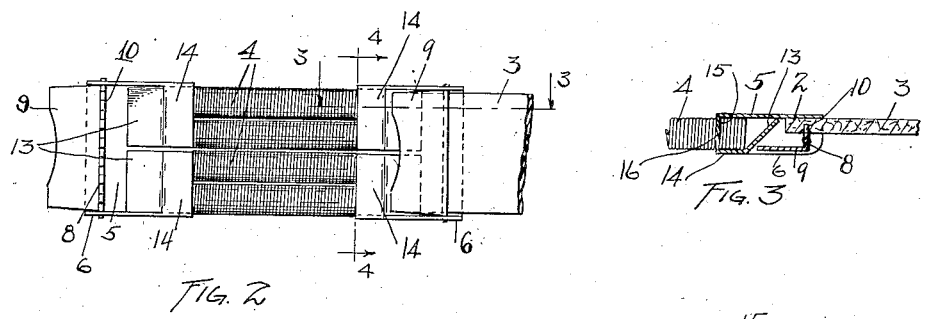
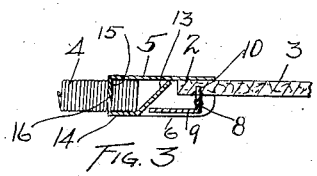
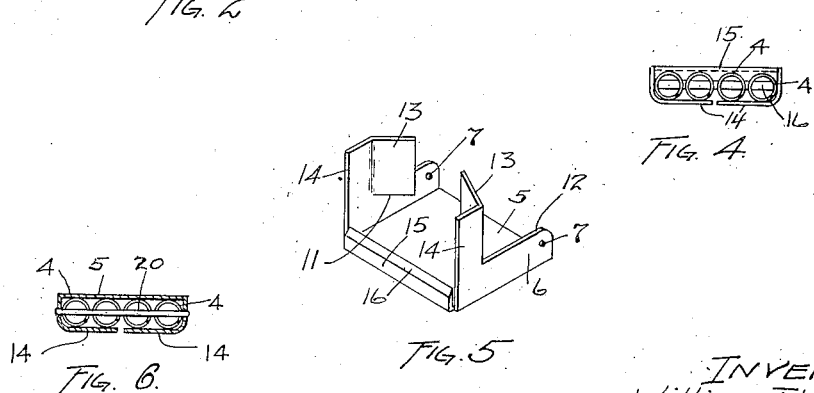

WILLIAM J. WHALEN, OF CLEVELAND, OHIO.

FLEXIBLE MEMBER FOR BELTS.

1,382,700.  Specification of Letters Patent.  Patented June 28, 1921.

Application filed July 31, 1919. Serial No. 314,507.

*To all whom it may concern:*

Be it known that I, WILLIAM J. WHALEN, a citizen of the United States, and a resident of Cleveland, county of Cuyahoga, and State of Ohio, have invented a new and useful Improvement in Flexible Members for Belts, of which the following is a specification, the principle of the invention being herein explained and the best mode in which I have contemplated applying that principle, so as to distinguish it from other inventions.

The present invention relates, as indicated, to flexible members for belts and the like, and pertains more particularly to belts for personal wear, being inserted within the circumference of the belt, forming therewith a belt which is elastic and at all times permits the belt to expand or contract as conditions warrant. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a perspective view of a belt showing my flexible member inserted therein; Fig. 2 is a rear elevation of the device; Fig. 3 is a horizontal section taken on the line 3—3, Fig. 2; Fig. 4 is a vertical section on the line 4—4, Fig. 2; Fig. 5 is a perspective of one of the parts; and Fig. 6 is a vertical section of a modified detail of construction.

My device is adapted to be inserted at a suitable place within the circumference of a belt, and more preferably at the rear, it being necessary to cut a short length of the belt away at the desired point and fasten my flexible member therein. As shown the device comprises two end plates or clamping members 1 adapted to engage the ends 2 of a belt 3. Interposed between the members 1 and fixedly held therein are coiled springs 4. The form of the members 1 is of particular interest and comprises a base portion 5 having side pieces 6 extending therefrom. The side pieces 6 adjacent the ends 2 of the belt 3 are provided with apertures 7, in which is mounted the usual saw-toothed clamping member 8 having a portion 9 parallel to the base 5 of the member 1, and another portion 10 at right angles thereto, the outer edge of the portion 10 being saw-toothed and adapted to engage the end of the belt 3 and firmly retain it in engagement with the member 1. The opposite ends of the side walls 6 are enlarged and slotted as at 11 on a line which is a continuation of the upper surface 12 of the side walls 6. The slot 11 terminates short of the ends of the walls and the flange 13 formed thereby is bent at an angle to the remaining flange or clip 14. The end of the base 5 of the member 1, opposite to the clamping member 8 is provided with a downturned flange 15 having a knife or wedge-shaped edge 16 thereon.

In assembling the device the springs 4 are inserted in the member 1 so that the knife edge 16 projects between the convolutions of the springs 4 adjacent their outer edges. The portion 14 is then bent over the ends of springs by means of a die, or in any other suitable manner, and thereby firmly holds the springs against removal, the previously bent portion 13 protecting the ends of the springs, as will be best seen in Figs. 2 and 3. The ends of the belt are then inserted in the member 1 and the clamping member 8 is forced into engagement therewith.

In Fig. 6 I have shown a modified form of means for holding the springs 4 in the member 1, which consists of a pin 20 passing between the convolutions of the springs 4 and being riveted through the side walls 6.

As will be seen, I have provided a flexible member adapted to be inserted within the circumference of a belt for personal wear which is both simple and easy to manufacture, and which is adapted to efficiently accomplish the purpose for which it is constructed. I have furthermore provided a very simple and effective means for retaining the springs in the end plates, comprising a wedge-shaped member adapted to be inserted between the convolutions of the springs and being clamped therein by a flange, the end plate, and the clamping means being integral and stamped in one piece.

It is obvious that my device can be used in other furnishings, such as suspenders and the like, or for any device of a similar character, where it is desirable to have same flexible.

Other modes of applying the principle of my invention may be employed instead of the one explained, changes being made as regards the mechanism herein disclosed, provided the means stated by any of the following claims or the equivalent of such stated means be employed.

I therefore particularly point out and distinctly claim as my invention:—

1. In combination with a belt for personal wear, clamping members, means in said clamping members adapted to removably retain said belt in said clamping means, coiled springs interconnecting said clamping members, a wedge-shaped member on said clamping member adapted to engage between the convolutions of said coiled springs, and a clip adapted to retain said coiled springs in engagement with said wedge-shaped member.

2. In combination with a belt for personal wear, clamping members removably engaging said belt, coiled springs interconnecting said clamping means, said clamping means being provided with a wedge-shaped member adapted to engage between the convolutions of said coiled springs, a clip integral with said clamping means adapted to retain said coiled springs in engagement with said wedge-shaped member on said clamping means and a flange on said clip adapted to cover the ends of said coiled springs.

3. In combination with a belt for personal wear, clamping members removably attached to said belt, coiled springs disposed between said clamping members, said clamping means comprising a wedge-shaped member adapted to engage between the convolutions of said coiled springs, and flanges adapted to be folded over said coiled springs, whereby said coiled springs are held in engagement with said wedge-shaped member.

4. In a flexible member for garments, the combination of clamping members, coiled springs disposed between said clamping members, said clamping members being provided with a depending flange having a wedge shaped edge adapted to engage between the convolutions of said coiled springs, flanges adapted to be folded over said coiled springs and means on said clamping members for removably attaching said flexible member to said garment.

Signed by me, this 24th day of July, 1919.

WILLIAM J. WHALEN.